Jan. 19, 1960 E. FAIRSTEIN 2,922,036
PARALYZER FOR PULSE HEIGHT DISTRIBUTION ANALYZER
Filed Jan. 25, 1955 2 Sheets-Sheet 1
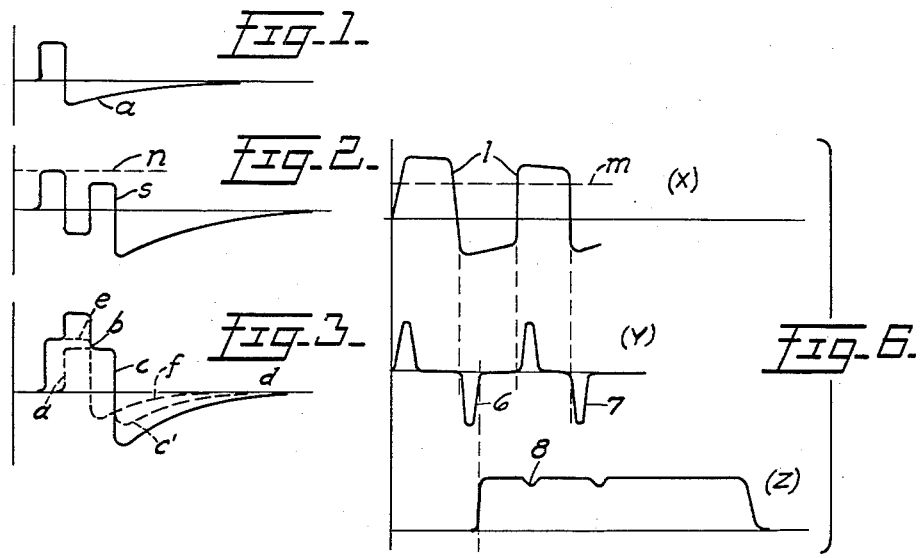
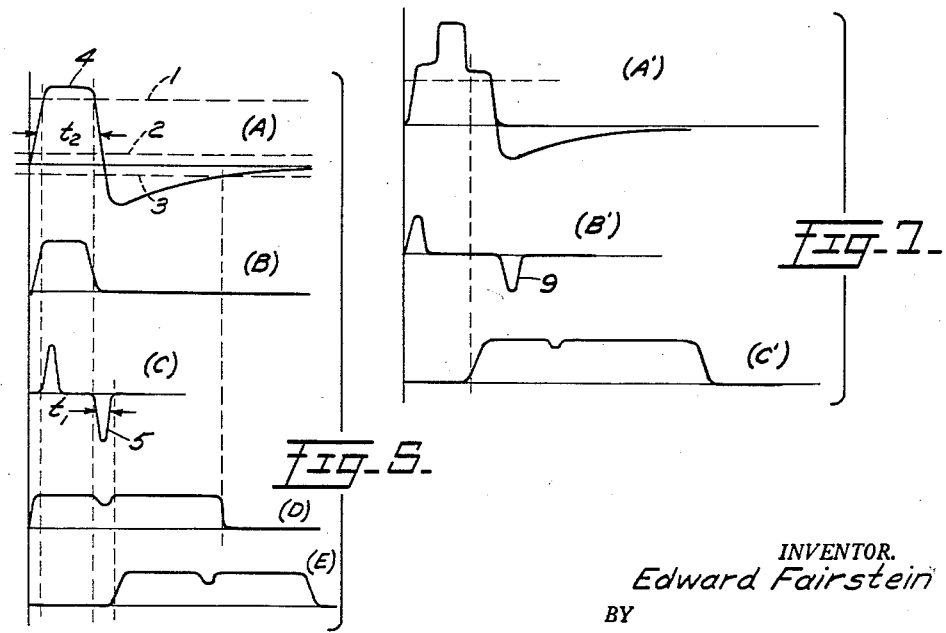
INVENTOR.
Edward Fairstein
BY
ATTORNEY

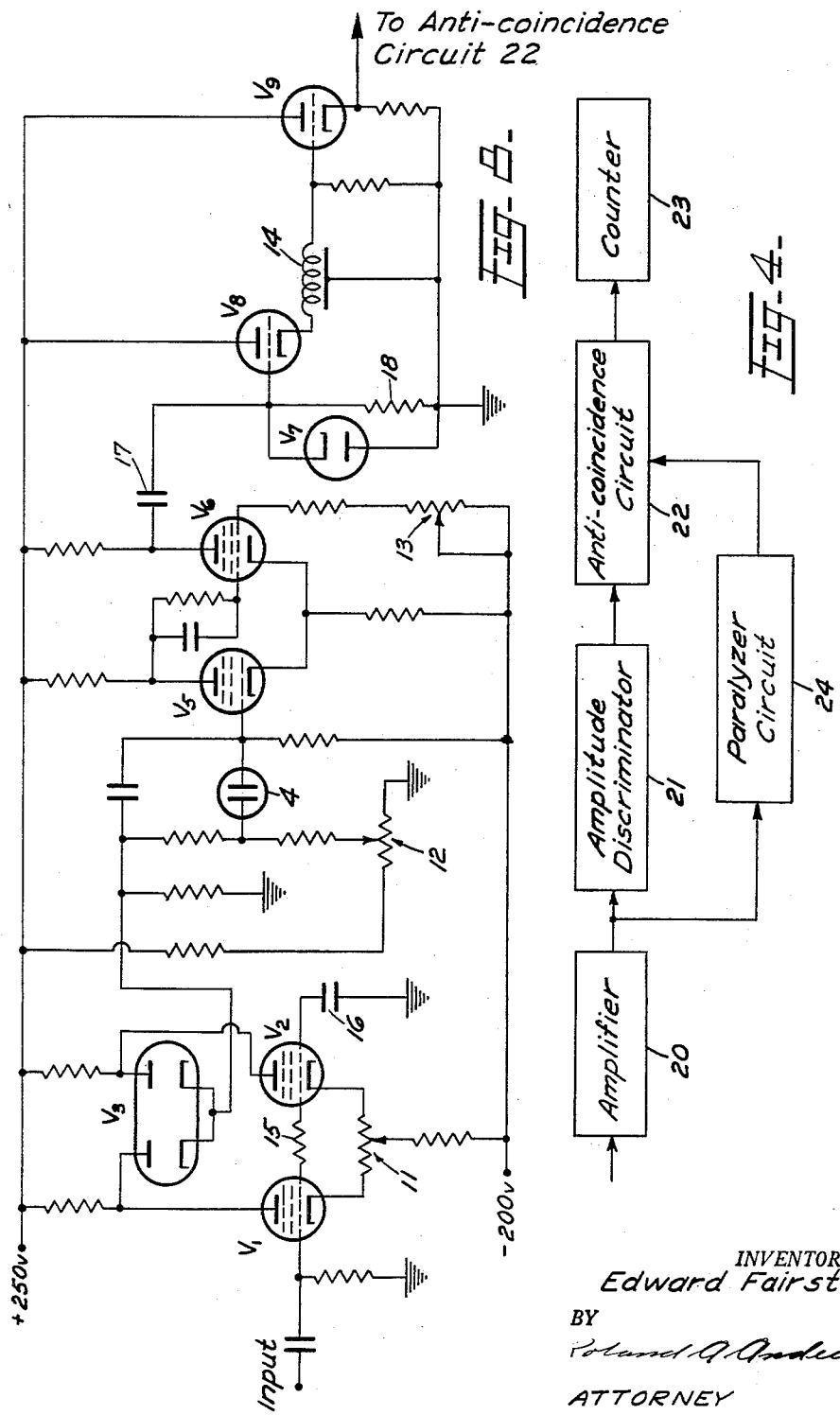

United States Patent Office
2,922,036
Patented Jan. 19, 1960

2,922,036

PARALYZER FOR PULSE HEIGHT DISTRIBUTION ANALYZER

Edward Fairstein, Oak Ridge, Tenn., assignor to the United States of America as represented by the United States Atomic Energy Commission Application January 25, 1955, Serial No. 484,088

3 Claims. (Cl. 250—27)

This invention relates to pulse height distribution analyzers and more particularly to an electronic counter paralyzer for preventing the system from counting certain undesired pulses.

In the pulse height distribution analyzer systems of the prior art, discriminators are generally employed in the pulse channels for passing pulses above a predetermined magnitude. The pulses passing through the system are generally amplified by the conventional resistance-capacitance coupled amplifier so that the pulses which appear at the output of the amplifier usually have tails with relatively long undershoots which fall below the base line. In a case where the second of two pulses occurs before the channel amplifier has recovered from the first, the second pulse falling within the undershoot of the first pulse has its magnitude incorrectly measured, since the discriminator measures pulse height from the base line. Again where two pulses occur so close together that one falls upon the other, the result is a false indication since the system tends to measure the two pulses as only a single pulse.

Applicant with a knowledge of these problems of the prior art has for an object of his invention the provision of a paralyzer for a pulse height distribution analyzer which prevents it from counting pulses which fall in the undershoot of other pulses.

Applicant has as another object of his invention the provision of a paralyzer for preventing a pulse height distribution analyzer from counting overlapping pulses where they would serve to provide a false indication.

Applicant has as another object of his invention the provision of a paralyzer for a pulse height distribution analyzer which produces control pulses at its output that are independent of the polarity of the input pulse which triggers it.

Applicant has as a further object of his invention the provision of a paralyzer for a pulse height distribution analyzer which will provide an accuracy of measurement of pulses which would not be obtained with discriminators available for use with amplifiers having the desired pulse width.

Applicant has as a still further object of his invention the provision of a paralyzer for a pulse height distribution analyzer system which applies a pulse to a channel of the anti-coincidence circuit to prevent the passage of a signal from the discriminator when two pulses applied to the system are too close together or overlap.

Other objects and advantages of my invention will appear from the following specification and accompanying drawings, and the novel features thereof will be particularly pointed out in the annexed claims.

In the drawings:

Figure 1 is a graph of a pulse from a conventional resistance-capacitance coupled amplifier, employing a shorted delay line as a means of pulse shaping.

Figure 2 is a graph of two pulses which occur so close together that the second pulse falls on the undershoot of the first one.

Figure 3 is a graph showing the effect of having pulses pile up on each other.

Figure 4 is a block diagram of a pulse height distribution analyzer system employing my improved paralyzer.

Figure 5 shows a series of wave shapes which occur in a pulse height distribution analyzer system as the result of a pulse from the amplifier.

Figure 6 is a series of curves showing the effect upon a pulse height distribution analyzer system using my improved paralyzer when the second of two pulses falls on the undershoot of the first.

Figure 7 is a series of curves showing the effect upon a pulse height distribution analyzer system using my improved paralyzer when two pulses occur so close together that one falls on top of the other one.

Figure 8 is a schematic of the circuit of one embodiment of my improved paralyzer.

In a conventional pulse amplifier discriminator combination used to measure the energy and distribution of disintegrations of a radioactive source, one finds that if the second of two pulses occurs before the amplifier has recovered from the first, the second pulse will be incorrectly measured.

Referring to Figure 1, a pulse is shown with an exaggerated undershoot. In Figure 2 the dotted line represents the true height of the two pulses shown. However, the second pulse appears to have a lower amplitude because it falls on the undershoot of the first pulse.

In Figure 3 two pulses have been shown that are so close together that they overlap or pile up resulting in the solid line curve. The initial portion of the full line curve with its dotted extension $e$, $f$ represents the shape of the pulse as it would appear without the presence of the second pulse. The curve $a$, $b$, $c$, $c'$ represents the shape of the second pulse had it occurred alone or in the absence of the first pulse, and full line curve with tail $d$ represents the wave shape of the combined pulses.

The applicant's invention relates to the circuit which prevents the discriminator from counting pulses which fall in the categories illustrated in the graphs of Figures 2 and 3.

Figure 4 is a block diagram of a conventional counting system with applicant's paralyzer circuit incorporated therein. In this system, 20 designates generally a conventional resistance-capacitance coupled amplifier for amplifying the pulses prior to feeding them to the amplitude discriminator 21. The amplitude discriminator is of the usual type, producing signals at its output in response to pulses whose magnitudes are above the threshold setting thereof. The output of the discriminator 21 then feeds into one channel of a conventional anti-coincidence circuit 22. My improved paralyzer is coupled to the output of the amplifier 20 and its output is fed into the other channel of the anti-coincidence circuit 22. A counter 23 which takes the form of a count rate meter circuit, scaler, or recorder of suitable type receives its signal from the anti-coincidence circuit 22. It is to be noted that pulses produced by the amplitude discriminator 21 will be passed to the counter 23 only in the absence of a pulse from the paralyzer circuit 24. A pulse, from the paralyzer circuit only, will not be registered or recorded by the counter 23. The effect of a pulse in the circuit of Figure 4 is indicated by the graphs of Figure 5, where a pulse from the amplifier represented by curve number 4 is shown in graph A of Figure 5. The dotted line 1 of this graph represents the level of the triggering threshold of the amplitude discriminator 21. If pulses are more positive than dotted line 2 of the graph, or more negative than dotted line 3 of the graph, they will trigger the paralyzer circuit 24. Dotted lines 2 and 3 are equidistant from the base line, and it will be observed that their distance from the base line represents only a very small fraction of the maximum amplitude of a pulse which the amplifier 20 can transmit. One of the properties of the paralyzer 24 is that the polarity of the pulse it produces is independent of the pulse which triggered it. It should be noted that the paralyzer output pulse reaches its maximum shortly after the pulse from the amplifier exceeds the level of dotted line 2, and that the paralyzer pulse is not cut off until the magnitude of the undershoot becomes less than the distance represented by the difference between the base line and the dotted line 3. Graph B of Figure 5 represents the output pulse from the pulse discriminator 21 resulting from the input pulse of curve 4 of graph A. This pulse is differentiated by an appropriate differentiating circuit in the discriminator 21 and then assumes the wave form of graph C. The anti-coincidence circuit is arranged so that only the negative portion of the pulse, indicated by curve 5 can trigger it. The pulse from the paralyzer 24 is shown in Figure 5D and is delayed by an amount just sufficient so that it reaches its maximum amplitude at the time when part 5 of the curve of graph C is returning to the base line. This pulse shown in Figure 5E, is then applied to the second channel of the anti-coincidence circuit. The manner in which the circuit is effected can be observed from a study of the curves of Figure 6. The dotted line $m$ in graph X of that figure represents the threshold level of the amplitude discriminator. The solid line curve 1 of graph X represents two pulses from the amplifier so close together that the second falls on the undershoot of the first. Graph Y of Figure 6 represents the differentiated output of the amplitude discriminator 21 which is applied to one channel of the anti-coincidence circuit 22. Graph Z represents the delayed output from the paralyzer circuit 24 which is applied to the second channel of the anti-coincidence circuit 22. Pulses 6 and 7 are not in coincidence so that the first of these two amplifier pulses will pass through the anti-coincidence circuit 22 and be registered by the counter 23. Pulses 7 and 8 of the graphs Y and Z, however, are in coincidence and will result in the rejection of the second amplified pulse of the anti-coincidence circuit.

A second example is shown in Figure 7 wherein two amplified pulses occur so close together that one falls on top of the other, the result being shown in graph A'. The dotted line represents the threshold level of the amplitude discriminator. Graph B' represents the differentiated output which is applied to one channel of the anti-coincidence circuit 22. Graph C' represents the delayed output of the paralyzer 24 which is applied to the second channel of the anti-coincidence circuit. Because of the pulse pile up, pulse 9 of graph B' which would normally be effective in triggering the anti-coincidence circuit is delayed by an amount greater than the delay of the leading edge of pulse C'. Since this makes pulse 9 and the pulse of graph C' coincident, neither amplifier pulse is registered by the anti-coincidence circuit.

Referring again to Figure 5, $t_1$ is the width of pulse 5 in graph C, and $t_2$ is the width of the amplifier pulse in graph A of that figure. It can be shown in the general case that if the second of two pulses occurs in the time interval $t_1$ seconds after the start of the first pulse, and the time required for the first pulse to die away to the level within the dotted lines 2 and 3 in graph A has elapsed the second or both of the pulses will be rejected by the anti-coincidence circuit. Thus, a system is presented that reduces the effective dead time of a pulse amplifier without requiring the output pulse width to be reduced, and provides accuracy which would normally be associated with an amplifier whose resolving time was $t_1$ rather than $t_2$.

Since it may be difficult or impossible to build a discriminator which would operate accurately with an amplifier whose pulse width was as narrow as $t_1$ seconds, this circuit makes possible an accuracy of measurement which would otherwise be difficult or impossible to obtain.

Referring now to the circuit of Figure 8, showing a preferred form of my improved paralyzer, $V_1$ and $V_2$ are a pair of cathode coupled amplifiers. The cathode coupling takes the form of a potentiometer 11 and is employed to balance the plate current of the two tubes $V_1$, $V_2$. The resistance-capacitance network 15, 16 serves as a decoupling network and is of a type which will always refer the input of the circuit to the base line of the amplifier with which it is used. The output circuits of tubes $V_1$, $V_2$ are connected into a full wave rectifier which takes the form of a double diode $V_3$. The cathode coupled pair $V_5$, $V_6$ are connected as a conventional Schmitt trigger circuit and are D.C. coupled to the common cathode output of double diode $V_3$. Voltage divider 12 acts as a threshold control for the trigger circuit $V_5$, $V_6$, and is in the circuit with neon lamp 4 which acts as a battery with a small internal resistance so as to drop the D.C. level of a point in the circuit without attenuating the A.C. signal. The potentiometer 13 is connected in the control grid circuit of tube $V_6$ and serves as the zero adjustment for the trigger circuit. The output of the trigger circuit is coupled through condenser 17 and resistor 18 to cathode follower $V_8$. Tube $V_7$ is a restoring diode bridged across resistor 18 in the grid circuit of tube $V_8$ and functions to keep the voltage drop across condenser 17 at a constant level. The cathode follower $V_8$ drives the delay line 14 which feeds into cathode follower $V_9$. The cathode follower $V_9$ serves as the output stage and is connected into one channel of the anti-coincidence circuit 22.

In its operation, a pulse from the amplifier 20 appears at the input of the paralyzer and if it is a positive pulse, it causes tube $V_1$ to increase the plate current, and tube $V_2$ to decrease its plate current. This results in a negative signal on the plate of the left diode, and a positive signal on the plate of the right diode, of double diode $V_3$. The right diode conducts and the cathode goes positive producing a positive signal at the input grid of the Schmitt trigger circuit $V_5$, $V_6$. If it exceeds the threshold of the trigger circuit, heretofore referred to in connection with the discussion of Figure 5, the trigger circuit is triggered or flipped, and produces a positive pulse at its output. The trigger circuit $V_5$, $V_6$ will remain in the triggered state until its input signal drops below its threshold level, thereby sustaining the pulse which was impressed upon its input. The output pulse from the trigger circuit passes through cathode follower $V_8$ which serves as a power amplifier to drive the low impedance delay line 14. The pulse after being delayed in the delay line 14 is fed to cathode follower $V_9$ which acts as a buffer stage to prevent interference of the operation of the delay line.

Now if a negative pulse from the amplifier 20 appears at the input of the paralyzer, amplifier $V_1$ conducts less and amplifier $V_2$ increases its conduction. This produces a positive signal on the plate of the left diode of double diode $V_3$ and a negative pulse on the plate of the right diode of this tube. The left diode of double diode $V_3$ conducts and the cathode again goes positive producing the same type of operation in the remainder of the circuit as that heretofore described in connection with positive pulse at the paralyzer input.

Having thus described my invention, I claim:

1. An electronic system for the passage of pulses comprising a signal channel including an amplifier, an amplitude discriminator fed by the amplifier for passing pulses above a predetermined magnitude, said discriminator including means for differentiating the pulses to produce positive and negative pips corresponding to the leading and trailing edges of said pulses, an anti-coincidence circuit coupled to the discriminator for passing the negative pips of the trailing edges of said pulses, and a paralyzer circuit coupled to the anti-coincidence circuit and responsive to signals from said amplifier for providing a delayed signal which is independent of the polarity of said signals to produce coincidence in said anti-coincidence circuit for subsequent pulses while a pulse is being counted in in the system.

2. In a pulse height distribution analyzer of the duel channel type, a lower signal channel for the passage of pulses including a resistance-capacitance coupled amplifier for producing pulses having negative undershoots extending from the trailing edges thereof, an amplitude discriminator fed by the amplifier for passing pulses above a predetermined magnitude, said discriminator including means for differentiating the pulses to produce positive and negative pips corresponding to the leading and trailing edges of said pulses, an anti-coincidence circuit coupled to the discriminator for passing the negative pips of the trailing edges of said pulses, and a paralyzer circuit coupled to the anti-coincidence circuit and responsive to the same pulses that are fed to the discriminator by said amplifier for providing delayed signals for application to the anti-coincidence circuit to produce coincidence therein and inhibit passage of additional pulses during the period of said negative undershoots.

3. A paralyzer for a pulse alayzer system comprising a pair of cathode coupled amplifiers for amplifying pulses of opposite polarity, diodes having their anodes coupled to the separate outputs of said amplifiers to produce only positive signals, a trigger circuit, means for coupling the diodes to the trigger circuit for operation by input pulses of either polarity from the amplifiers, and a delay network coupled to the output of the trigger circuit for delaying the pulses.

References Cited in the file of this patent

UNITED STATES PATENTS

| | | |
|---|---|---|
| 2,348,016 | Michel | May 2, 1944 |
| 2,539,998 | Holland-Martin et al. | Jan. 30, 1951 |
| 2,545,214 | Schock | Mar. 13, 1951 |
| 2,648,766 | Eberhard | Aug. 11, 1953 |
| 2,694,146 | Fairstein | Nov. 9, 1954 |
| 2,716,189 | Ayres | Aug. 23, 1955 |
| 2,760,064 | Bell | Aug. 21, 1956 |
| 2,762,914 | Peterson et al. | Sept. 11, 1956 |
| 2,775,698 | Bell et al. | Dec. 25, 1956 |
| 2,779,869 | Gerks | Jan. 29, 1957 |
| 2,820,895 | Johnstone | Jan. 21, 1958 |

OTHER REFERENCES

A. B. Van Renner: "Pulse-Amplitude Analysis In Nuclear Research," Parts I–IV, Nucleonics, vol. 10, July 1952—pp. 20–27, August 1952—pp. 22–28, September 1952—pp. 32–38, October 1952—pp. 50–58.